United States Patent
Duan et al.

(10) Patent No.: US 7,565,717 B2
(45) Date of Patent: Jul. 28, 2009

(54) HINGE ASSEMBLY

(75) Inventors: Chao Duan, Shenzhen (CN); Shun Guo, Shenzhen (CN); Chia-Hua Chen, Tu-Cheng (TW)

(73) Assignees: Shenzhen Futaihong Precision Industry Co., Ltd., Shenzhen, Guangdong Province (CN); FIH (Hong Kong) Limited, Kowloon (HK)

( * ) Notice: Subject to any disclaimer, the term of this patent is extended or adjusted under 35 U.S.C. 154(b) by 501 days.

(21) Appl. No.: 11/392,045

(22) Filed: Mar. 28, 2006

(65) Prior Publication Data

US 2006/0225246 A1    Oct. 12, 2006

(30) Foreign Application Priority Data

Apr. 8, 2005    (CN)    ............ 2005 1 0034106

(51) Int. Cl.
  *E05F 1/08*    (2006.01)
(52) U.S. Cl. ............... 16/303; 455/575.3; 379/433.13; 16/277
(58) Field of Classification Search ............ 16/303, 16/330, 256, 277, 284, 285, 328; 455/575.3; 379/433.13; 348/333.06; 361/680–682; 248/920–923
See application file for complete search history.

(56) References Cited

U.S. PATENT DOCUMENTS

| | | | | |
|---|---|---|---|---|
| 6,115,886 | A * | 9/2000 | Fujita | 16/330 |
| 6,175,990 | B1 * | 1/2001 | Kato et al. | 16/334 |
| 6,757,940 | B2 * | 7/2004 | Lu et al. | 16/330 |
| 7,027,846 | B2 * | 4/2006 | Pan | 455/575.3 |
| 7,031,466 | B2 * | 4/2006 | Lu et al. | 379/433.13 |
| 7,100,239 | B2 * | 9/2006 | Duan et al. | 16/303 |
| 7,100,244 | B2 * | 9/2006 | Qin et al. | 16/330 |
| 7,107,648 | B1 * | 9/2006 | Lu et al. | 16/330 |
| 7,203,995 | B2 * | 4/2007 | Hsu et al. | 16/330 |
| 7,401,382 | B2 * | 7/2008 | Luo | 16/303 |
| 7,404,235 | B2 * | 7/2008 | Duan et al. | 16/330 |
| 2004/0020012 | A1 * | 2/2004 | Gupte | 16/303 |
| 2005/0257343 | A1 * | 11/2005 | Gupte | 16/330 |
| 2006/0070211 | A1 * | 4/2006 | Luo | 16/303 |
| 2006/0085947 | A1 * | 4/2006 | Ge et al. | 16/303 |
| 2006/0096063 | A1 * | 5/2006 | Duan et al. | 16/303 |
| 2006/0117527 | A1 * | 6/2006 | Tu et al. | 16/303 |
| 2006/0117528 | A1 * | 6/2006 | Duan et al. | 16/303 |
| 2006/0117529 | A1 * | 6/2006 | Duan et al. | 16/303 |
| 2006/0123595 | A1 * | 6/2006 | Duan et al. | 16/337 |
| 2006/0265838 | A1 * | 11/2006 | Duan et al. | 16/325 |
| 2007/0039135 | A1 * | 2/2007 | Duan et al. | 16/330 |

* cited by examiner

*Primary Examiner*—Wiliam L. Miller
(74) *Attorney, Agent, or Firm*—Steven M. Reiss

(57) ABSTRACT

A hinge assembly (100) is provided for joining a flip cover (204) to a main body (202) of a foldable electronic device. A hinge assembly includes a hinge shaft (10), a follower (12), and a cam (20). The follower has an outer peripheral portion. The outer peripheral portion has opposite two ends. The cam has a cam hole (22) closely receiving the follower therein. Then cam has an inner peripheral portion movably contacting the outer peripheral portion. The outer peripheral portion is in the form of a screw formed by a cross-section of the follower rotated from one end to the other. The inner peripheral potion is rifled to receive the follower.

17 Claims, 8 Drawing Sheets

HINGE ASSEMBLY

FIELD OF THE INVENTION

The present invention relates to hinge assemblies and, particularly, to a hinge assembly for foldable electronic devices, such as mobile telephones, electronic notebooks, and so on.

DISCUSSION OF THE RELATED ART

With the development of wireless communication and information processing technologies, portable electronic devices such as mobile telephones and electronic notebooks are now in widespread use. These electronic devices enable consumers to enjoy high technology services anytime and anywhere. Consumers particularly favor foldable electronic devices due to their convenience and ease of storage.

Generally, foldable electronic devices have most of the electronics in one housing, called the body. The other housing, called the cover, normally contains fewer electronic components than the body. Other foldable electronic devices have all the electronics in the body, with the cover containing no electronics. Various types of hinge assemblies are used to join a body and a cover of a foldable electronic device, so that the cover can unfold up from and fold down upon the body. Manufacturers are constantly seeking to reduce the volume, size and weight of portable foldable electronic devices. Thus, it is desirable that the hinge assembly coupling the main housing with the cover is modularized and miniaturized. A modularized hinge assembly has moving parts such as a cam member, a cam follower, a shaft, and a spring, held together in a unified structure. Either the cam member or the cam follower directly contacts the spring. The structure is easily and quickly attached to the main housing and the cover during mass production. The cam member and the cam follower always contact each other under the force of the spring.

Although suitable for some foldable electronic devices, sliding friction is produced between the cam member and the cam follower because of the relative rotation therebetween. This friction wastes energy (i.e., making opening and/or closing of the device more difficult) and causes abrasion of the cam member and the cam follower. The worn surface can further add to the friction therebetween and may eventually lead to premature malfunction or failure of the hinge assembly. In addition, it is difficult to make the configuration of the cam surface of the cam member and the cam follower.

What is needed, therefore, is a hinge assembly which overcome the above-described shortcomings.

SUMMARY OF THE INVENTION

In one aspect thereof, a hinge assembly is provided for joining a flip cover to a main body of a foldable electronic device. A hinge assembly includes a hinge shaft, a follower, and a cam. The follower has an outer peripheral portion. The outer peripheral portion has opposite two ends. The cam has a cam hole closely receiving the follower therein. Then cam has an inner peripheral portion movably contacting the outer peripheral portion. The outer peripheral portion is in the form of a screw formed by a cross-section of the follower rotated from one end to the other. The inner peripheral potion is rifled to receive the follower.

Other advantages and novel features will become more apparent from the following detailed description when taken in conjunction with the accompanying drawings.

BRIEF DESCRIPTION OF THE DRAWINGS

Many aspects of the hinge assembly can be better understood with reference to the following drawings. The components in the drawings are not necessarily drawn to scale, the emphasis instead being placed upon clearly illustrating the principles of the present hinge assembly. Moreover, in the drawings, like reference numerals designate corresponding parts throughout the several views.

DETAILED DESCRIPTION OF PERFERRED EMBODIMENTS

Figure 1:
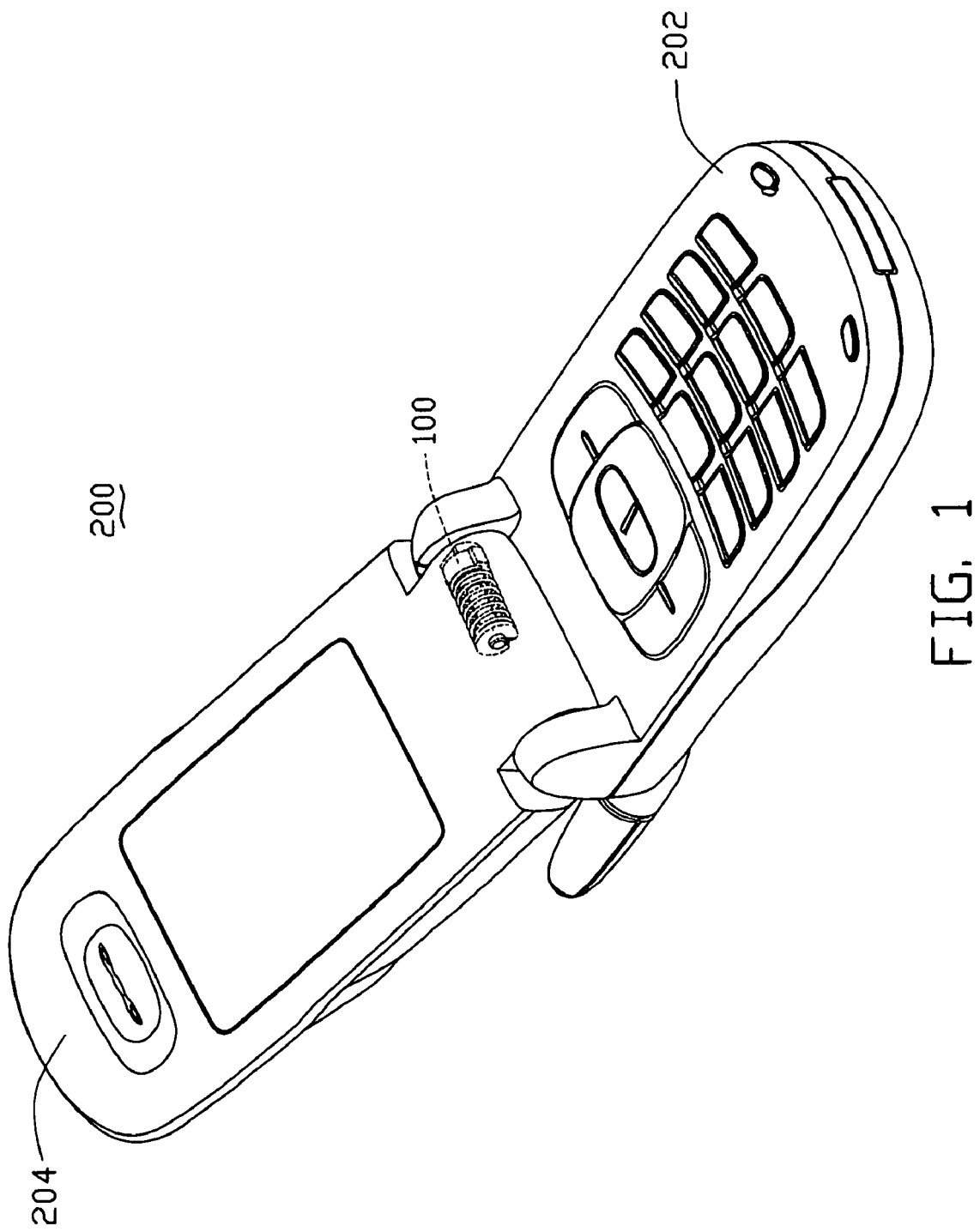
FIG. 1 is an isometric view of a flip-type mobile phone according to a first preferred embodiment, the hinge assembly being shown with dashed lines.

Referring now to the drawings, FIG. 1 shows a flip type mobile phone 200, which includes a hinge assembly 100 (according to a first preferred embodiment), a main body 202, and a flip cover 204. The main body 202 and the flip cover 204 are pivotally connected to each other via the hinge assembly 100.

Figure 2:
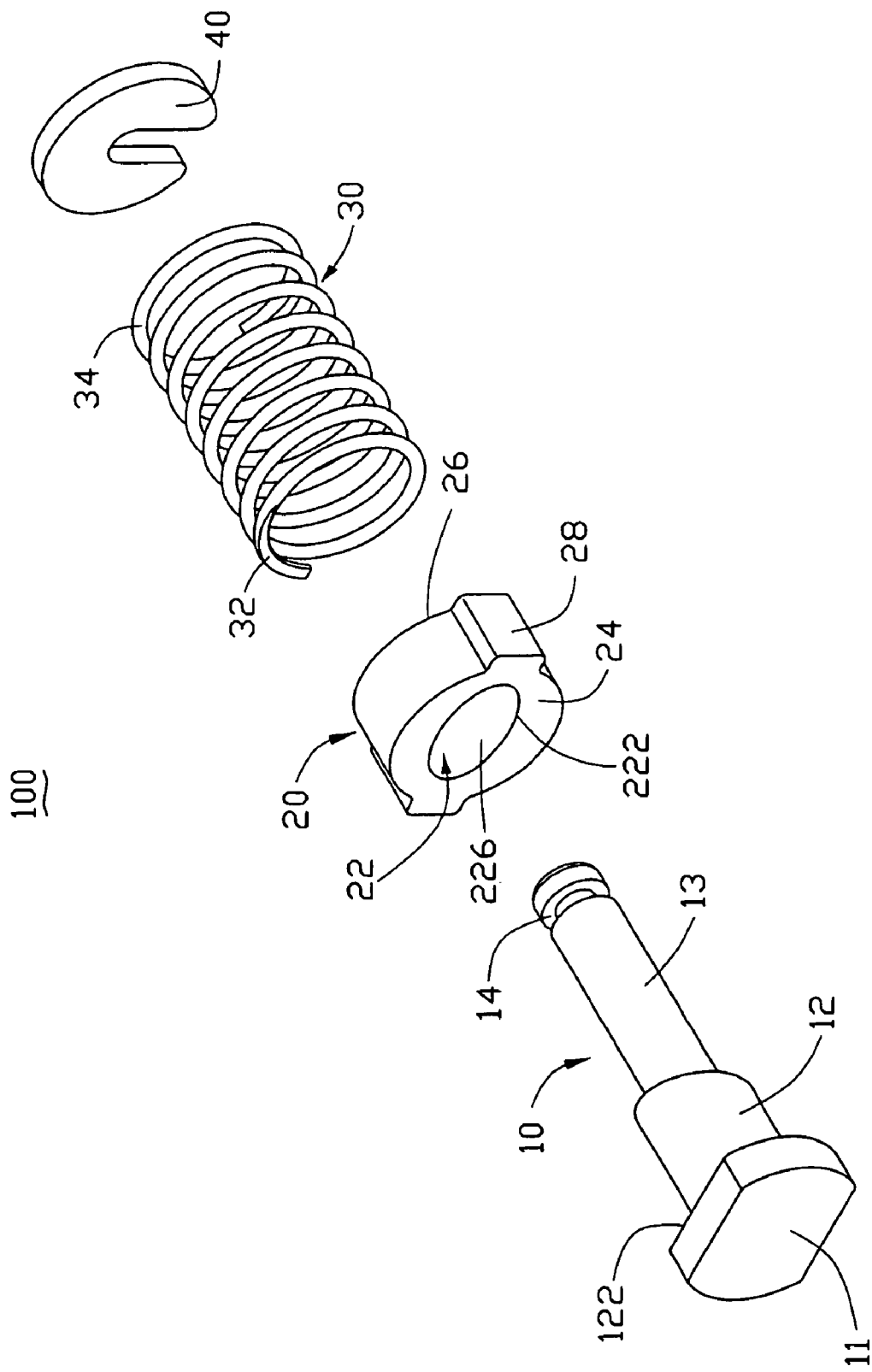
FIG. 2 is an enlarged, exploded, isometric view of the hinge assembly of FIG. 1.

FIG. 2 shows various parts of the hinge assembly 100. The hinge assembly 100 may be used to interconnect components like a main body and a flip cover of any kind of foldable electronic device, such as the flip type mobile phone 200. Furthermore, the hinge assembly 100 may prove useful in other applications (e.g. cabinet doors) beyond foldable electronic devices, and such uses are considered to be within the scope of the present hinge device. Referring now to FIG. 2, the hinge assembly 100 includes a shaft 10, a cam 20, a spring 30 functioning as an elastic element or urging mechanism, an E-ring 40 functioning as a fastening means. The shaft 10 extends through the cam 20, the spring 30, and the E-ring 40, in that order, thereby integrating the hinge assembly 100 into a complete unit.

Figure 3:
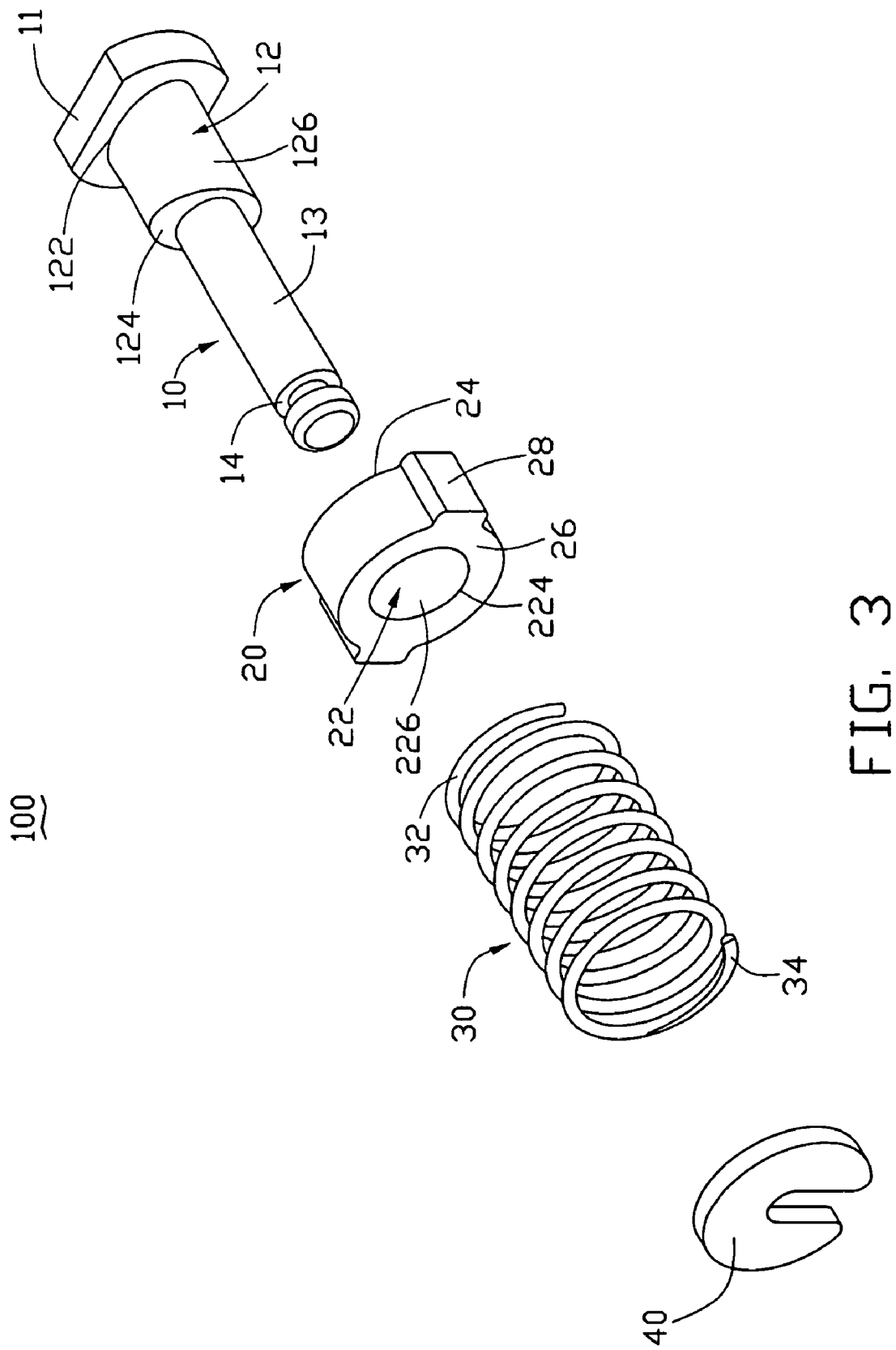
FIG. 3 is similar to FIG. 2, but viewed from another aspect.
Figure 4:
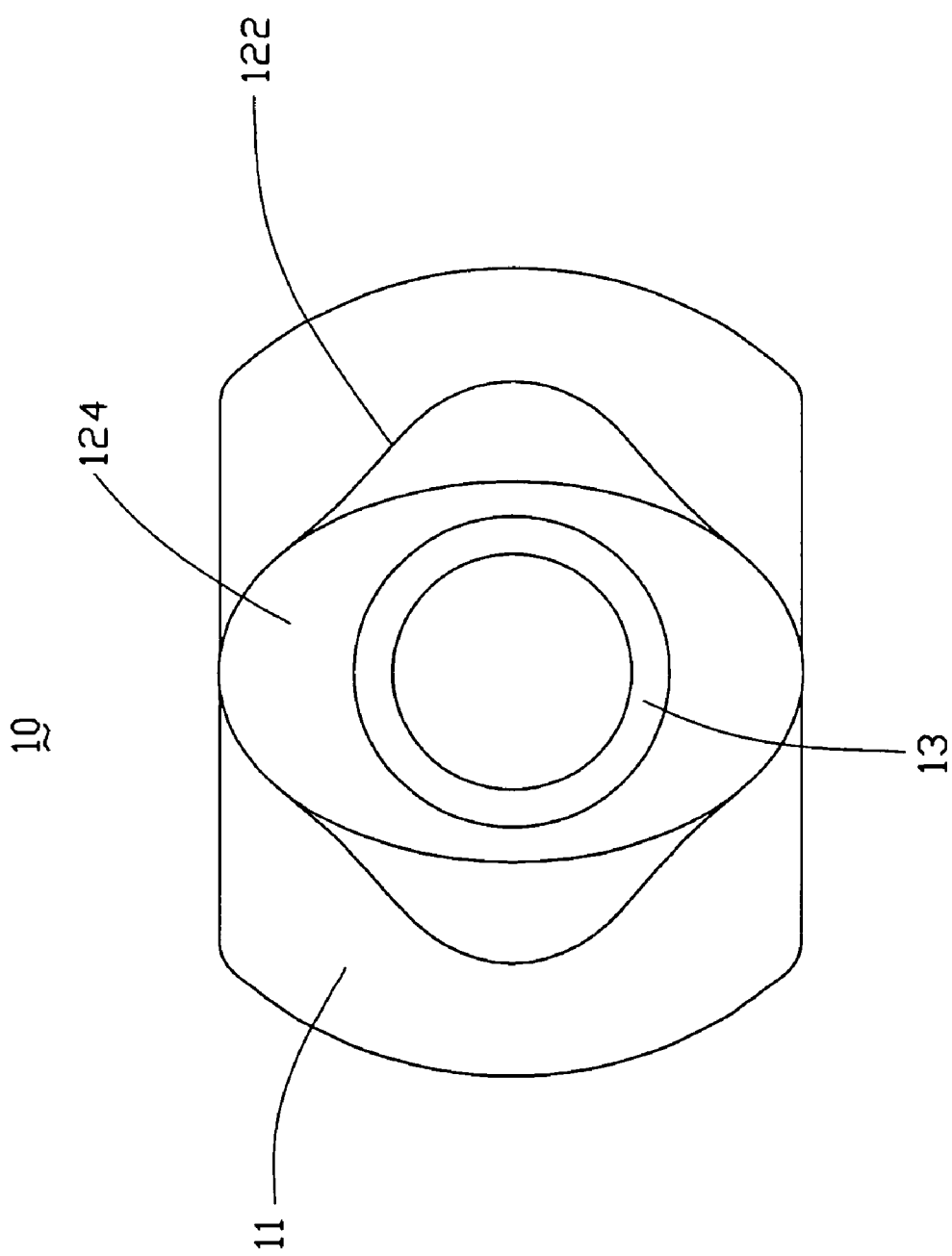
FIG. 4 is an plan view of a shaft of the hinge assembly.

Also referring to FIG. 3 and FIG. 4, the shaft 10 includes, a securing portion 11 formed at one end thereof, a follower 12 adjacent to the securing portion 11, a shaft portion 13 and a peripheral groove 14 as a latching portion defined therein adjacent another end thereof. The securing portion 11 is configured for engaging/connecting with the main body 202 of the mobile phone 200. The follower 12 is a cylinder, and includes a first end surface 122, and a second end surface 124. The first end surface 122 is substantially ellipsoidal in shape, and includes a first major axis and a first minor axis. The second end surface 124 is also substantially ellipsoidal, and includes a second major axis and a second minor axis. The second major axis of the second end surface 124 is substantially perpendicular to the first major axis of the first end surface 122. A follower surface 126 is formed between the first end surface 122 and the second surface 124.

The cam 20 is a substantially cylindrical body and has a central cam hole 22 therethrough. The cam 20 has a first end surface 24 and a second end surface 26. The cam hole 22 has a front end 222 in the first end surface 24 and a rear end 224 in the second end surface 26. The front end 222 is an ellipsoid, and has a third major axis and a third minor axis. The rear end 224 is also ellipsoidal in shape, and includes a fourth major axis and a fourth minor axis. The third major axis of the front end 222 is perpendicular to the fourth major axis of the rear end 224. A inner receiving surface 226 is formed between the front end 222 and the rear end 224. The inner receiving surface 226 is of a shape corresponding to the follower surface 126 of the follower 12. The cam 20 has a protrusion 28 functioning as a securing means formed on an outer peripheral wall thereof and is oriented parallel to a central axis of the cam 20. The protrusion 28 is configured for engaging with the flip cover 204 of the mobile phone 200.

The spring 30 is advantageously metallic and helical, with an inner diameter larger than a diameter of the shaft portion 13 of the shaft 10. Thus, the spring 30 can surround the shaft 10. A first end 32 of the spring 30 resists the second end surface 26 of the cam 20, and an opposite second end 34 of the spring 30 resists the E-ring 40. It is, however, to be understood that any spring 30 (i.e. any kind of elastic element) regardless of configuration or composition, which may be suitably employed to resist both the surface of the cam and the E-ring 40 is considered to be within the scope of the present hinge system.

Figure 5:
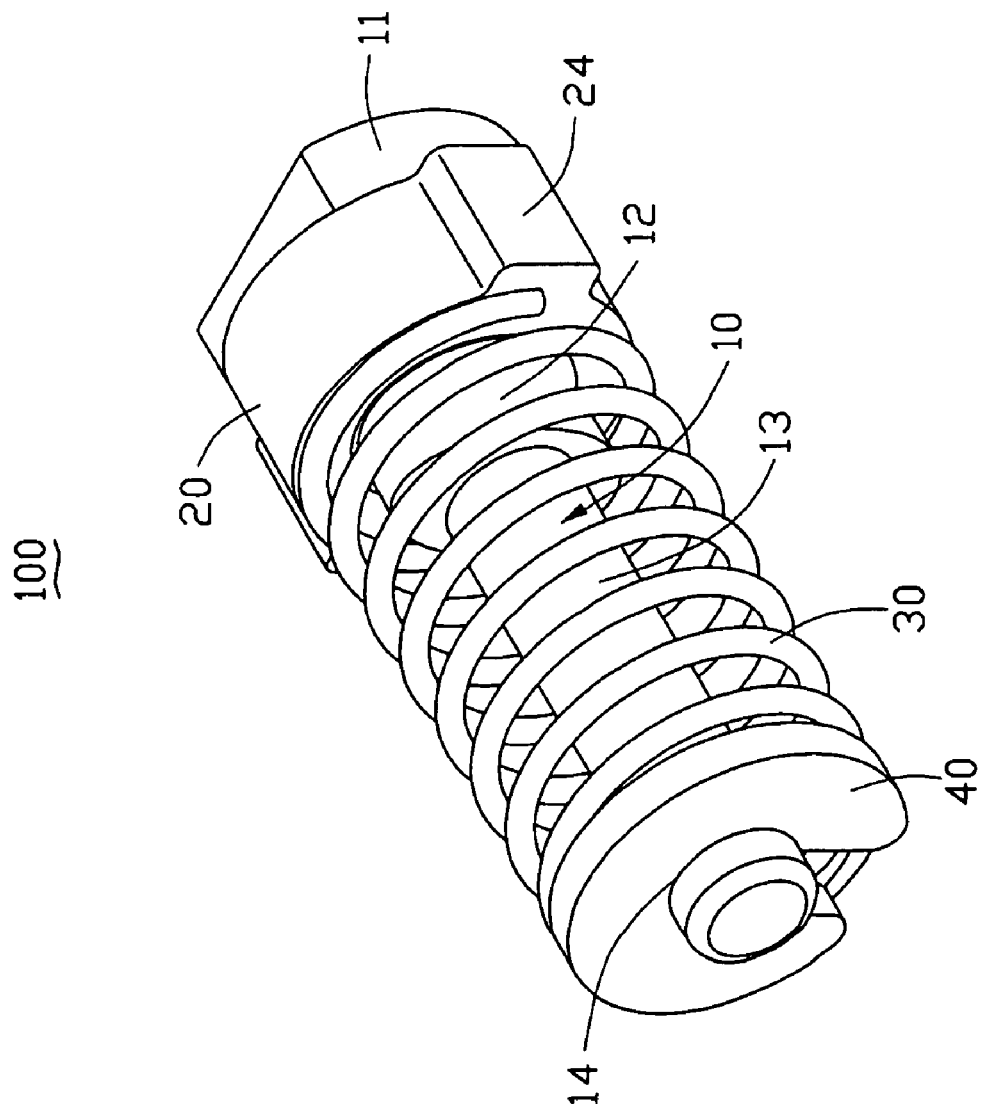
FIG. 5 is an assembled view of the hinge assembly of FIG. 2.

Referring to FIG. 5, in assembly of the hinge assembly 100, firstly, the shaft 10 passes in succession through the cam hole 22 of the cam 20, the spring 30, and then the E-ring 40. The E-ring 40 is snap-fitted around the peripheral groove 14 of the shaft 10, such that the spring 30 is at least slightly compressed, even at when at the maximum extension allowed in the assembled state of the hinge assembly 100. The first end 32 of the spring 30 resists the second end surface 26 of the cam 20. The second end 34 of the spring 30 resists the E-ring 40. The inner receiving surface 226 of the cam 20 always contacts the follower surface 126 of the follower 12 no matter what rotational position the cam 20 is in, because of the urging force of the spring 30. The hinge assembly 100 is thus completely assembled, as shown in FIG. 4.

Referring to FIG. 1, in use, the protrusion 28 is engaged in a cavity (not shown) of the flip cover 204 of the mobile phone 200, and the securing portion 11 of the shaft 10 is engaged in the main body 202 of the mobile phone 200. When the flip cover 204 of the mobile phone 200 is in a fully closed position or a fully open position, the first end surface 122 of the follower 12 contacts the front end 222 of the cam 20, and the first major axis of the first end surface 122 of the follower 12 is parallel to the third major axis of the front end 222 of the cam 20. The spring 30 is slightly compressed such that the cam 20 and the follower 12 are in a stable state.

When the flip cover 204 of the mobile phone 200 is rotated between an open position and a closed position (or vice versa), the cam 20 rotates along with the flip cover 204, while the shaft 10 remains fixed in the main body 202 of the mobile phone 200. As a result, a relative rotation is produced between the cam 20 and the follower 12 of the shaft 10. The inner receiving surface 226 of the cam 20 slides relative along the follower surface 126 of the follower 12 of the shaft 10, with the cam 20 moving toward the E-ring 40 and compressing the spring 30. When the inner receiving surface 226 of the cam 20 is rotated about 90 degrees, the spring 30 reaches maximum compression. The cam 20 continues to rotate until the third major axis is deflected from the second minor axis of the follower 12 by outer force. At this state, the spring 30 decompresses and drives the cam 20 back toward the follower 12, with the inner receiving surface 226 of the cam 20 riding along the follower surface 126 of the follower 12 of the shaft 10. The flip cover 204 is thus rotated automatically to the fully closed position (or fully open position) under the decompression force of the spring 30. Accordingly, the flip cover 204 is moved a predetermined maximum angular amount relative to the main body 202, with the first end surface 122 of the follower 12 contacts the front end 222 of the cam 20. In this way, the flip cover 202 is closed (or opened). The structures of the flip cover 204 and the main body 202 may be adapted to control the degree of rotation of the hinge assembly.

Figure 6:
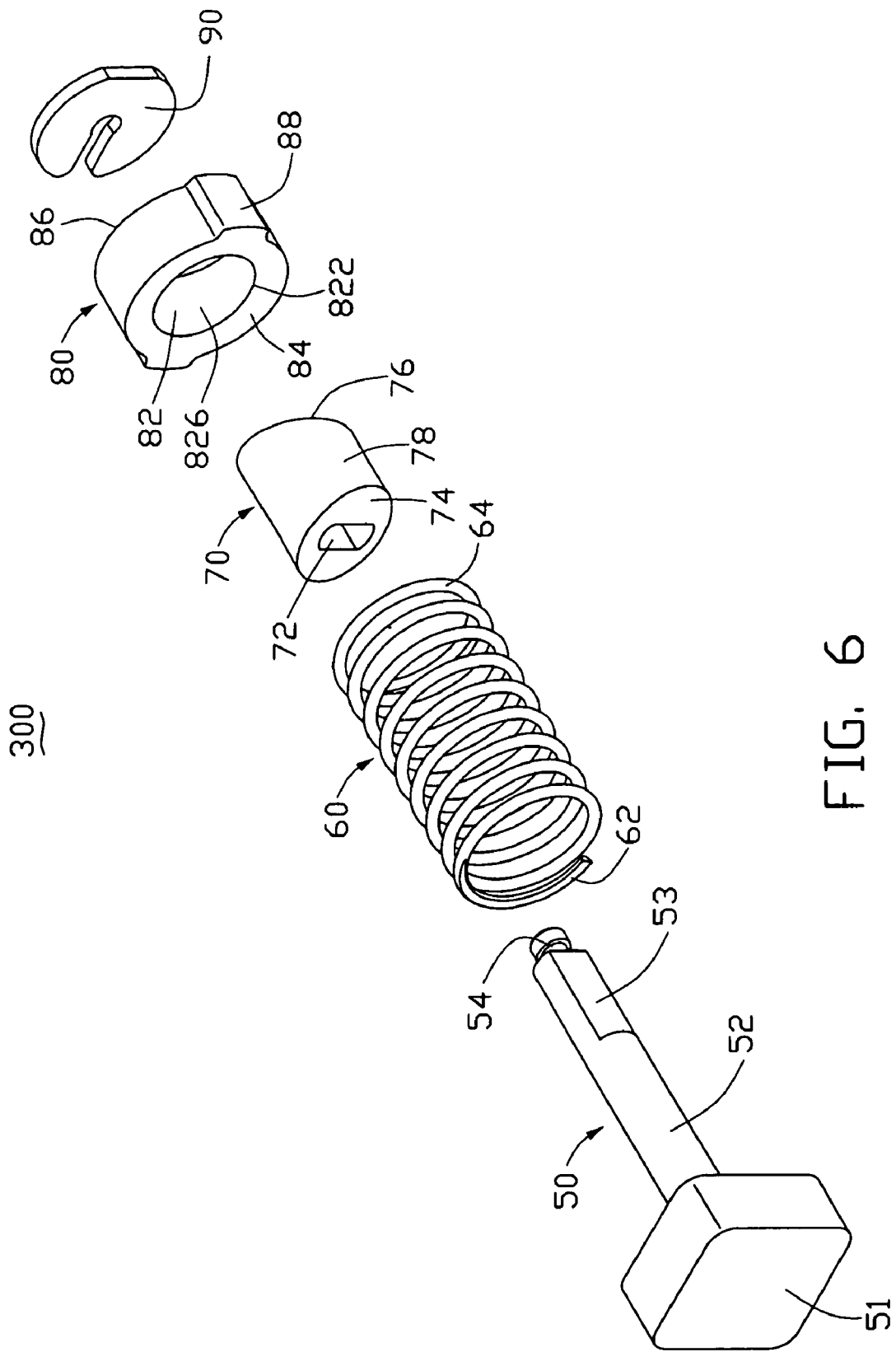
FIG. 6 is an exploded, isometric view of the hinge assembly according to a second preferred embodiment.
Figure 7:
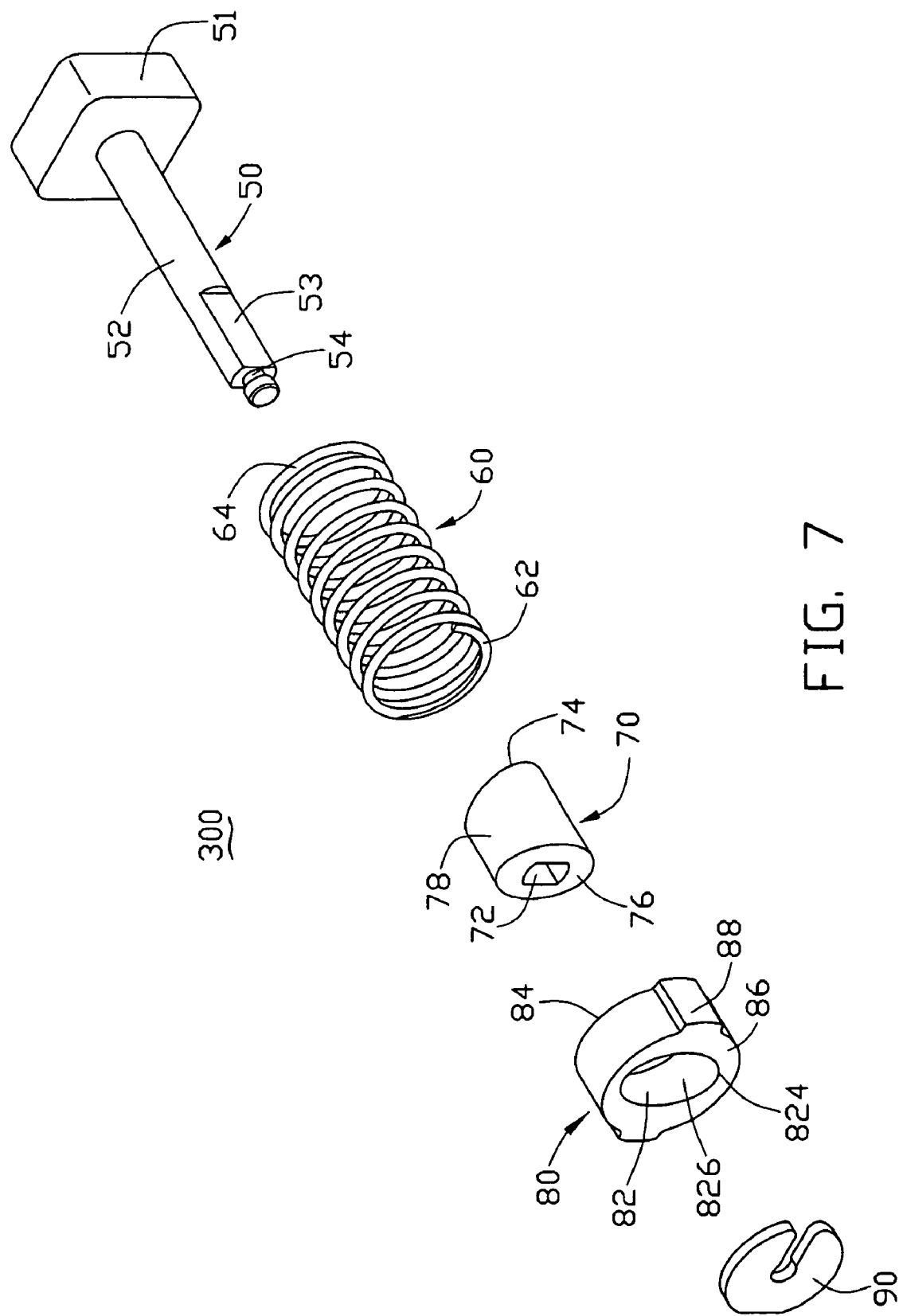
FIG. 7 is similar to FIG. 6, but viewed from another aspect.

Referring to FIGS. 5 and 6, a hinge assembly 300 according to a second preferred embodiment of the present invention is shown. The hinge assembly 300 includes a shaft 50, a spring 60, a follower 70, a cam 80 and an E-ring 90. The shaft 50 extends through the spring 60, the follower 70, the cam 80, and the E-ring 90, in that order, thereby integrating the hinge assembly 300 into a complete unit.

The shaft 50 includes, in sequence, a securing portion 51 formed at one end thereof, a shaft portion 52, a deformed shaft portion 53, and a peripheral groove 54 as a latching portion defined therein adjacent another end thereof. The securing portion 51 is configured for engaging/connecting with the main body 202 of the mobile phone 200.

The spring 60 is advantageously metallic and helical, with an inner diameter larger than a diameter of the shaft portion 52 of the shaft 50. Thus, the spring 60 can be located around the shaft 50. A first end 62 of the spring 60 resists the securing portion 51 of the shaft 50, the second end 64 of the spring 60 resists one surface of the cam 80.

The follower 70 is a deformable cylinder, and has a central deformed hole 72 therethrough, corresponding to the deformed shaft portion 53 of the shaft 50. The follower 70 includes a first end surface 74, and a second end surface 76. The first end surface 74 is ellipsoidal in shape, and includes a first major axis and a first minor axis. The second end surface 76 is also an ellipsoid, and includes a second major axis and a second minor axis. The second major axis of the first end surface 74 is perpendicular to the second major axis of the second end surface 76. A follower surface 78 is formed between the first end surface 74 and the second surface 76.

The cam 80 is a substantially cylindrical body and has a central cam hole 82 therethrough. The cam 80 has a first end surface 84 and a second end surface 86. The cam hole 82 has a front end 822 in the first end surface 84 and a rear end 824 in the second end surface 86. The front end 822 is ellipsoidal, and has a third major axis and a third minor axis. The rear end 824 is also ellipsoidal, and includes a fourth major axis and a fourth minor axis. The third major axis of the front end 822 is perpendicular to the fourth major axis of the rear end 824. An inner receiving surface 826 is formed between the front end 822 and the rear end 824. The follower surface 826 is corresponding to the follower surface 726 of the follower 70. The cam 80 has a protrusion 88 formed on outer peripheral wall thereof and is oriented parallel to a central axis of the cam 80. The protrusion 88 is configured for engaging with the flip cover 204 of the mobile phone 200.

Figure 8:
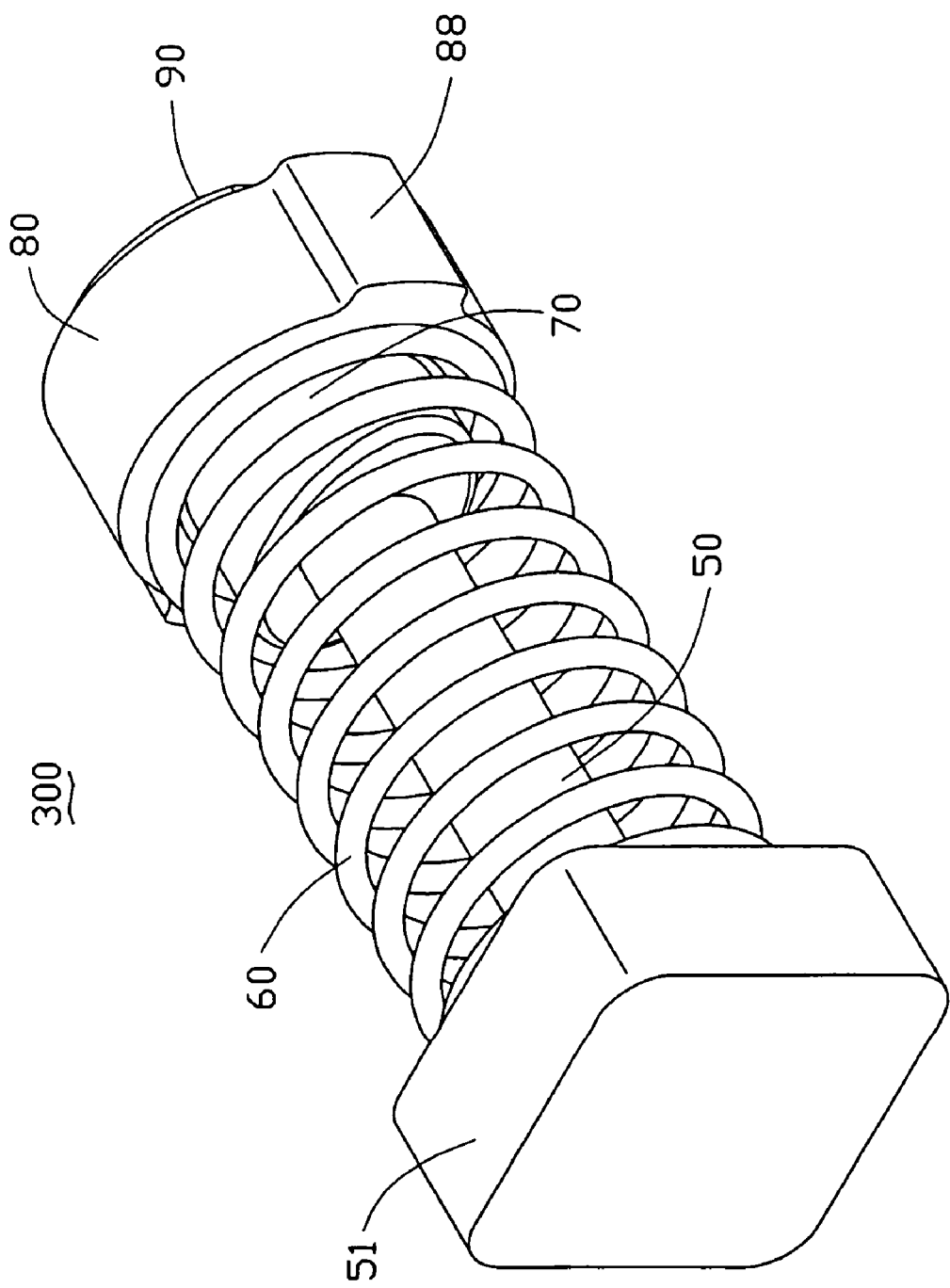
FIG. 8 is an assembled view of the hinge assembly of FIG. 6.

Referring to FIG. 8, in assembly of the hinge assembly 300, firstly, the shaft 50 is passed through the spring 60, the deformed hole 72 of the follower 70, the cam hole 82 of the cam 80, and the E-ring 90, in that order. The deformed hole 72 of the follower 70 engages around the deformed shaft portion 53 of the shaft 50 such that the follower 70 cannot rotate relative to the shaft 50. The E-ring 90 is snap-fitted around the peripheral groove 54 of the shaft 50, such that the spring 60 is at least slightly compressed, even at when at the maximum extension allowed in the assembled state of the hinge assembly 300. The first end 62 of the spring 60 resists the securing portion 51 of the shaft 50. The second end 64 of the spring 60 resists the first end surface 84 of the cam 80. The inner receiving surface 826 of the cam 80 always contacts the follower surface 78 of the follower 70 no matter what rotational position the cam 80 is in due to the urging force of the spring 60. The hinge assembly 300 is thus completely assembled, as shown in FIG. 3.

Referring to FIG. 1, in use, the protrusion 88 is engaged in a cavity (not shown) of the flip cover 204 of the mobile phone 200, and the securing portion 51 of the shaft 50 is engaged in the main body 202 of the mobile phone 200. When the flip cover 204 of the mobile phone 200 is in a fully closed position or a fully opened position, the first end surface 74 of the follower 70 contacts the front end 822 of the cam hole 82 of the cam 80, and the first major axis of the first end surface 74 of the follower 70 is parallel to the third major axis of the cam hole 82 of the front end 822 of the cam 80. The spring 60 is slightly compressed such that the cam 80 and the follower 70 are in a stable state.

When the flip cover 204 of the mobile phone 200 is rotated between an open position and a closed position (or vice versa), the cam 80 rotates along with the flip cover 204, while the shaft 50 remains fixed in the main body 202 of the mobile phone 200. As a result, a relative rotation is produced between the cam 80 and the follower 70. The inner receiving surface 826 of the cam 80 slides relative along the follower surface 726 of the follower 70, with the cam 70 moving toward the securing portion 51 of the shaft 10 and compressing the spring 60. When the revolving surface 826 of the cam 80 is rotated about 90 degrees, the spring 60 is reaches maximum compression. The cam 80 continues to rotate until the third major axis of the cam 80 is deflected from the second minor axis of the follower 70 by outer force. At this state, the spring 60 decompresses and drives the cam 80 back toward the E-ring 90, with the inner receiving surface 826 of the cam 80 riding along the follower surface 78 of the follower 70. The flip cover 204 is thus rotated automatically to the fully closed position (or fully open position) under the decompression force of the spring 60. Accordingly, the flip cover 204 is moved a predetermined maximum angular amount relative to the main body 202, with the first end surface 74 of the follower 70 contacting the front end 822 of the cam 80. In this way, the flip cover 202 is closed (or opened). Preferably, the structures of the flip cover 204 and the main body 202 are adapted to control the degree of rotation of the hinge assembly.

In the first embodiment, the E-ring 40 could be omitted, in which case the spring 30 directly resists the main body 202 of the mobile phone 200. The spring 30 may be made of nonmetallic material, such as plastic. Furthermore, the spring 30 can instead be another kind of elastic element or urging mechanism known in the art, such as a resilient cylinder.

In the second embodiment, the E-ring 40 could be omitted, in which case the spring 30 directly resists the main body 202 of the mobile phone 200. The spring 60 can be made of a nonmetallic material, such as plastic. Furthermore, the spring 60 can instead be another kind of elastic element or urging mechanism known in the art, such as a resilient cylinder. The securing portion 51 of the shaft 50 can be a separate element that is integrally formed with the shaft 50. The separate element is securely connected with the shaft 50 by threaded engagement.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A hinge assembly, comprising:
a shaft having a securing portion;
a follower fixed relative to the shaft, the follower having a first end surface and a second end surface, the first end surface and the second end surface each being substantially ellipsoidal, a major axis of the first end surface being substantially perpendicular to a major axis of the second end surface;
a cam, the cam having a cam hole extending therethrough, the cam hole receiving the shaft therethrough and the cam hole having a front end and a rear end, the front end and the rear end each being substantially ellipsoidal, a major axis of the front end being perpendicular to a major axis of the rear end;
an elastic element having a first end and an opposite second end, the first end of the elastic element abutting the cam, an inner peripheral surface of the cam rotatably and movably engaged with an outer peripheral surface of the follower under force of the elastic element.

2. The hinge assembly as claimed in claim 1, wherein the follower and the shaft are integrally formed, tie follower being adjacent the securing portion.

3. The hinge assembly as claimed in claim 1, further comprising a fastening means secured to an end of the shaft opposite to the follower, the second end of the elastic element abutting the fastening means.

4. The hinge assembly as claimed in claim 3, wherein the shaft further comprises a latching portion positioned at the end of the shaft opposite to the follower, the fastening means engaging with the latching portion.

5. The hinge assembly as claimed in claim 4, wherein the fastening means is an E-ring, and the latching portion of the shaft is a peripheral groove defined in the shaft, the E-ring engaging around the peripheral groove.

6. The hinge assembly as claimed in claim 1, wherein the shaft has a deformed shaft portion adjacent an end of the shaft opposite to the securing portion, and the follower has a deformed hole engaging with the deformed shaft portion, the second end of the elastic element abutting the securing portion.

7. The hinge assembly as claimed in claim 6, wherein the elastic element is a helical spring surrounding the shaft.

8. A hinge assembly, comprising:
a hinge shaft;
a follower fixed relative to the hinge shaft, the follower having an outer peripheral portion, the outer peripheral portion having opposite two ends defining a first end surface and a second end surface; and
a cam defining a cam hole closely receiving the follower therein, the cam having an inner peripheral portion movably contacting the outer peripheral portion as the inner peripheral portion is configured to receive the follower, the first end surface and the second end surface each being substantially ellipsoidal, a major axis of the first end surface being substantially perpendicular to a major axis of the second end surface.

9. The hinge assembly as claimed in claim 8, wherein the follower and the shaft are integrally formed.

10. The hinge assembly as claimed in claim 8, wherein the cam hole has a substantially ellipsoidal front end and a substantially ellipsoidal rear end a major axis of the ellipsoidal front end is substantially perpendicular to a major axis of the ellipsoidal rear end, the inner peripheral portion is formed between the front end and the rear end.

11. The hinge assembly as claimed in claim 8, further comprising a fastening means secured to an end of the shaft opposite to the follower.

12. The hinge assembly as claimed in claim 11, wherein the shaft further comprises a latching portion formed at the end of the shaft opposite to the follower, the fastening means engaging with the latching portion.

13. The hinge assembly as claimed in claim 12, wherein the fastening means is an E-ring, and the latching portion of the shaft is a peripheral groove defined in the shaft, the E-ring engaging around the peripheral groove.

14. The hinge assembly as claimed in claim 8, wherein the shaft has a deformed shaft opposite to the follower portion adjacent to an end of the shaft, and the follower has a deformed hole engaging with the deformed shaft portion.

15. The hinge assembly as claimed in claim 8, further comprising an urging mechanism, the shaft comprising a securing portion a first end of the urging mechanism abutting the cam, a second end of the urging mechanism abutting the securing portion.

16. The hinge assembly as claimed in claim 15, wherein the urging mechanism is a helical spring surrounding the shaft.

17. A foldable electronic device, comprising:
a main body;
a flip cover;
a hinge assembly joining the flip cover to the main body, the hinge assembly including:
  a shaft having a securing portion, the securing portion engaging with the main body;
  a follower fixed relative to the shaft, the follower having a first end surface and a second end surface, the first end surface and the second end surface each being substantially ellipsoidal end a major axis of the first end surface being substantially perpendicular to a major axis of the second end surface;
  a cam, the cam having a cam hole extending therethrough and a securing means fanned on outer periphery surface thereof, the cam hole receiving the shaft therethrough and the cam hole having a front end and a rear end, the front end and the rear end each being substantially ellipsoidal, a major axis of the front end being perpendicular to a major axis of the rear end, the securing means being operatively connected with the flip cover; and
  an elastic element having a first end and an opposite second end, the first end of the elastic element abutting the cam, an inner peripheral surface of the cam rotatably and movably engaged with an outer peripheral surface of the follower under force of the elastic element.

* * * * *